(12) United States Patent
Slater et al.

(10) Patent No.: US 8,234,336 B2
(45) Date of Patent: Jul. 31, 2012

(54) VIRTUAL CONFERENCE CENTER ARCHITECTURE

(75) Inventors: Chadlee R. Slater, Kirkland, WA (US); Natasha Desai, Bellevue, WA (US); Jay L. Vernon, Redmond, WA (US); Jeremy B. Smith, Redmond, WA (US); Robert D. George, Redmond, WA (US); Kyle Hagel, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1488 days.

(21) Appl. No.: 11/067,486

(22) Filed: Feb. 25, 2005

(65) Prior Publication Data

US 2006/0195519 A1 Aug. 31, 2006

(51) Int. Cl.
*G06F 15/16* (2006.01)
(52) U.S. Cl. .............................. 709/204; 709/225; 726/8
(58) Field of Classification Search .................. 709/205, 709/218, 249, 204, 225; 726/8, 12
See application file for complete search history.

(56) References Cited

U.S. PATENT DOCUMENTS

| | | | | |
|---|---|---|---|---|
| 5,341,477 A * | 8/1994 | Pitkin et al. | ..................... | 709/226 |
| 5,774,668 A * | 6/1998 | Choquier et al. | ............. | 709/223 |
| 6,128,644 A * | 10/2000 | Nozaki | ........................... | 709/203 |
| 6,182,131 B1 * | 1/2001 | Dean et al. | ..................... | 709/222 |
| 6,564,261 B1 * | 5/2003 | Gudjonsson et al. | ......... | 709/227 |
| 6,763,372 B1 * | 7/2004 | Dani et al. | ...................... | 709/204 |
| 6,898,633 B1 * | 5/2005 | Lyndersay et al. | ............. | 709/226 |
| 7,523,163 B2 * | 4/2009 | Zhu et al. | ....................... | 709/204 |
| 7,533,142 B2 * | 5/2009 | Ng et al. | ......................... | 709/202 |
| 2002/0007460 A1 * | 1/2002 | Azuma | ......................... | 713/201 |
| 2002/0129149 A1 * | 9/2002 | Schulz | .......................... | 709/226 |
| 2002/0156905 A1 * | 10/2002 | Weissman | ..................... | 709/229 |
| 2003/0061278 A1 * | 3/2003 | Agarwalla et al. | ............ | 709/203 |
| 2003/0074408 A1 * | 4/2003 | Clark et al. | ...................... | 709/206 |
| 2003/0204566 A1 * | 10/2003 | Dhupelia et al. | .............. | 709/205 |
| 2004/0128390 A1 * | 7/2004 | Blakley et al. | ................ | 709/228 |
| 2004/0158746 A1 * | 8/2004 | Hu et al. | ........................ | 713/202 |
| 2004/0250118 A1 * | 12/2004 | Andreev et al. | ................ | 713/201 |
| 2005/0108119 A1 * | 5/2005 | Beighton et al. | ................ | 705/34 |
| 2005/0171872 A1 * | 8/2005 | Burch et al. | ................... | 705/29 |
| 2008/0133413 A1 * | 6/2008 | Bennett et al. | .................. | 705/44 |
| 2009/0094383 A1 * | 4/2009 | Hinton et al. | ................. | 709/250 |
| 2010/0192197 A1 * | 7/2010 | Nadalin et al. | .................... | 726/2 |

OTHER PUBLICATIONS

"Getting Started with Microsoft® Office Live Meeting," Microsoft Office Live Meeting, Training Resource Center, © 2004 PlaceWare, Inc., 4 pages.

"Joining a Meeting," Microsoft Office Live Meeting, © 2003 PlaceWare, Inc., 12 pages.

"Meeting Administrator's Guide," Microsoft Office Live Meeting, © 2003 PlaceWare, Inc., 34 pages.

"Meeting Instantly with Microsoft® Office Live Meeting," Microsoft Office Live Meeting, Training Resource Center, © 2004 PlaceWare, Inc., 3 pages.

(Continued)

*Primary Examiner* — Jeffrey Nickerson
(74) *Attorney, Agent, or Firm* — Perkins Coie LLP

(57) ABSTRACT

A method, system, and architecture for providing a virtual conference center that effectively increases the number of accounts supported by a conference center. The virtual conference center architecture provides a virtual conference center that interfaces with multiple conference centers that each support a certain number of accounts. The virtual conference center provides an interface through which users can access their accounts on the conference centers as if their accounts were created on a single conference center. The users access their accounts and join conferences through the virtual conference center.

14 Claims, 15 Drawing Sheets

OTHER PUBLICATIONS

"Organizer's and Member's Guide," Microsoft Office Live Meeting, © 2003 PlaceWare, Inc., 90 pages.

"Scheduling Meetings," Microsoft Office Live Meeting, Quick Reference, Training Resource Center, © 2004 PlaceWare, Inc., 8 pages.

* cited by examiner

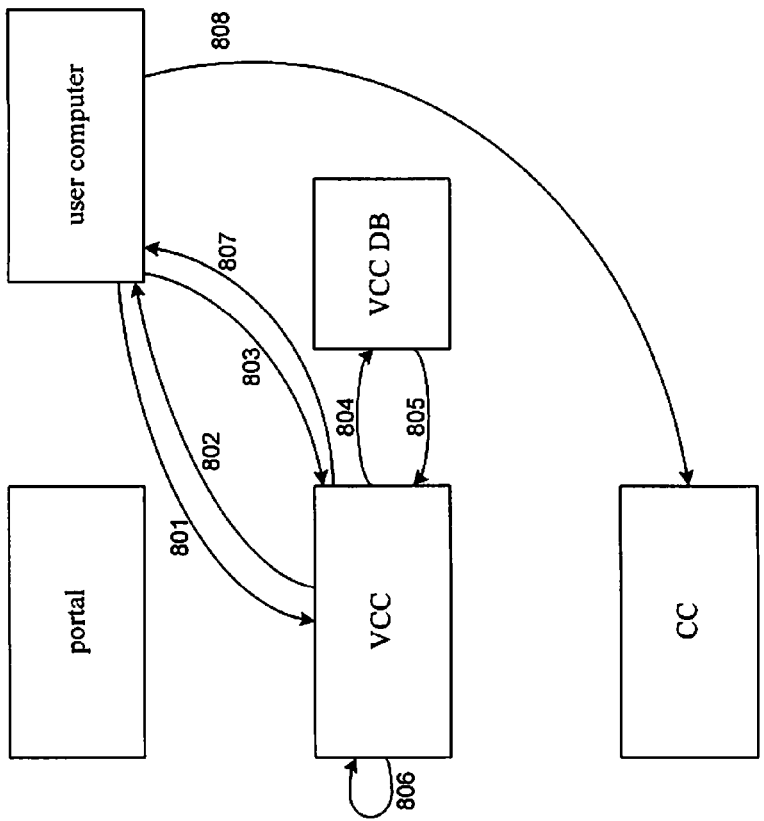

FIG. 8

Legend requests 801 a technical support web page from the virtual conference center, responds 802 with the web page.

requests 803 to log in the user as an administrator sending the user identifier and administrator password to the virtual conference center requests 804 the database to identify the conference center assigned to the user identifier.

responds 805 with the assigned conference center.

verifies 806 the administrative password.

sends 807 to the user's browser a script to log in the user as an administrator on the assigned conference center.

requests 808 to log the user in to the assigned conference center as an administrator.

VIRTUAL CONFERENCE CENTER ARCHITECTURE

TECHNICAL FIELD

The described technology relates generally to web-based conference centers and more particularly to increasing the number of users who can be associated with a conference center.

BACKGROUND

Web-based conference centers allow users to conduct distributed conferences that may include text, audio, and video content. A conference center is a server computer system that hosts conferences. To create a conference, the organizer of the conference uses the conference center to schedule the conference, send out invitations to conference participants, and provide the content of the conference. At the scheduled time, the participants of the conference can use their computer systems to join the conference being conducted via the conference center. A conference presenter can control the flow of the presentation of the content of the conference. The conference center sends to each participant the content that the presenter wants the participants to view or hear. Thus, participants at different locations can participate in a web-based conference hosted by a conference center.

Conference centers generally provide administrative, technical support, organization, presentation, and participation services. The administrative service allows a conference center administrator to create accounts for users who can organize and present conferences. A participant of a conference, in general, does not need an account on the conference center. The technical support service allows a conference organizer, presenter, or participant to elicit help from an administrator when they encounter problems using the conference center. The organization service allows an organizer of a conference to schedule a conference, send out invitations to participants, and specify the content of a conference. The presentation service allows a presenter to initiate a conference and to control the flow of the conference. The participation service allows the participants to join conferences to which they have been invited. The invitation that the participant receives may include a URL that identifies the conference. When a participant browses to that URL, the conference center provides a join conference web page through which the participant can identify themselves and enter a conference password, and join the conference.

Current conference center server computer systems can only support a limited number of user accounts. For example, some server computer systems can only support around 50,000 accounts. Some enterprises and businesses, however, may want accounts created for more than this limited number. Currently, to support more accounts, an enterprise would need to use multiple conference center server computer systems that each provide a different conference center. For example, an enterprise that needs 200,000 user accounts would need at least four different conference centers. There are, however, various disadvantages when an enterprise uses multiple conference centers. For example, the administrators of the conference centers would need to decide to which conference center each user should be assigned, that is, have their account created. As another example, each user would need to be aware of or have configured on their computer the identification of their assigned conference center. The maintaining of accounts across multiple conference centers can be time-consuming. It would be desirable to have a conference center that would support more than a limited number of user accounts and simplify the maintaining of accounts and the user experience.

SUMMARY

A method, system, and architecture for providing a virtual conference center that effectively increases the number of accounts supported by a conference center is provided. The virtual conference center architecture provides a virtual conference center that interfaces with multiple conference centers that each support a certain number of accounts. The virtual conference center provides an interface through which users can access their accounts on the conference centers as if their accounts were created on a single conference center. The users access their accounts and join conferences through the virtual conference center.

BRIEF DESCRIPTION OF THE DRAWINGS

FIG. 8 is a data flow diagram that illustrates the flow of data when a user accesses the technical support service of the virtual conference center in one embodiment.

DETAILED DESCRIPTION

Figure 1:
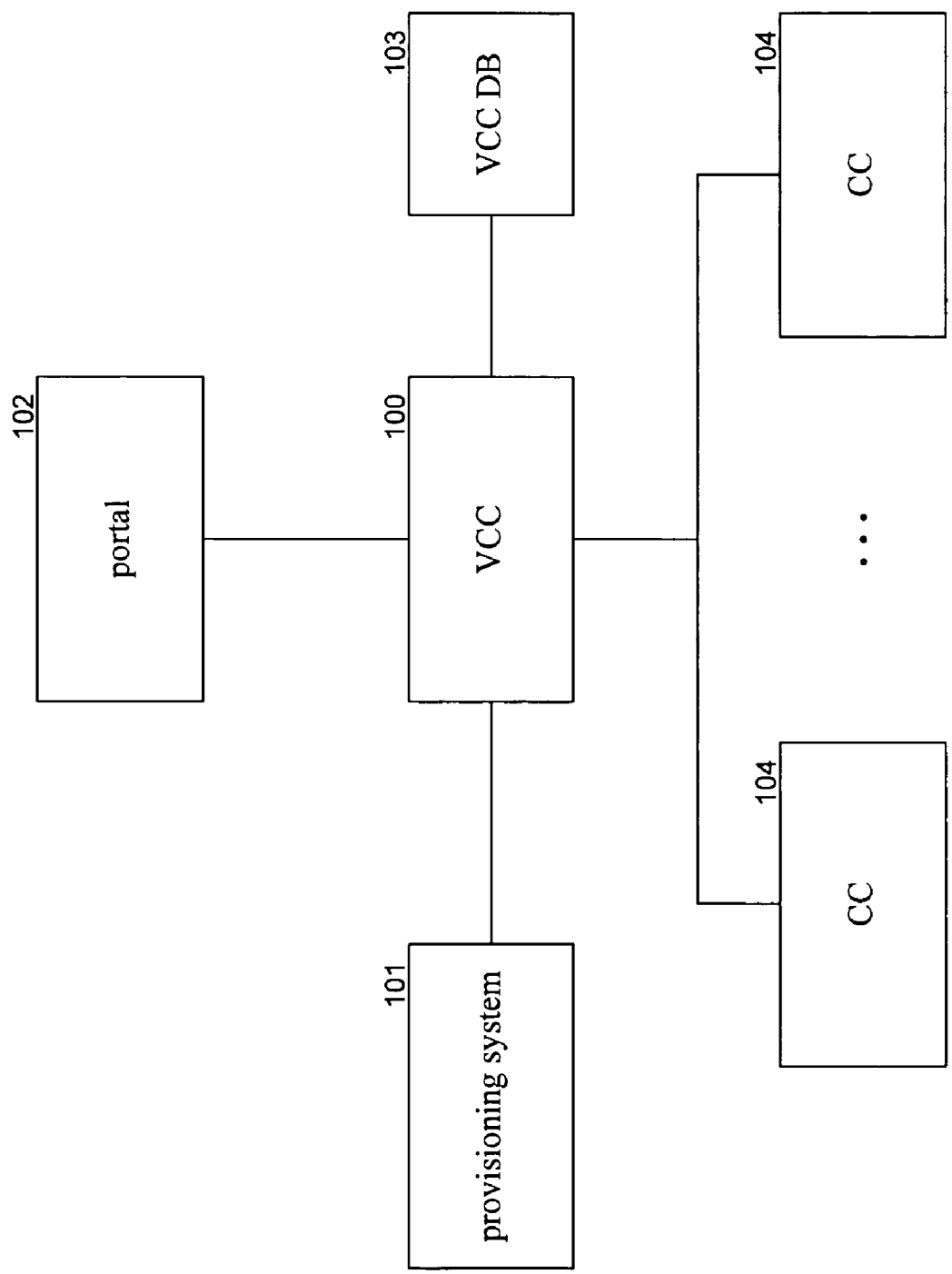
FIG. 1 is a block diagram illustrating the architecture of a virtual conference center in one embodiment.

A method, system, and architecture for providing a virtual conference center that effectively increases the limited number of accounts supported by a conference center is provided. In one embodiment, the virtual conference center architecture provides a virtual conference center that interfaces with multiple conference centers that each support a limited number of accounts. The virtual conference center provides an interface through which users can access their accounts on the conference centers as if their accounts were created on a single conference center. Each user is assigned a conference center and has an account on the assigned conference center. The virtual conference center has a mapping from each user to their assigned conference center. The users access their accounts and join conferences (or meetings) through the virtual conference center. When the virtual conference center receives a request from a user to access their account, it uses its mapping to identify the conference center assigned to the user and directs the user's computer to access that assigned conference center directly. When the virtual conference center receives a request from a user to join a conference, it identifies the conference center that is hosting the conference and directs the user's computer to join the conference directly with the hosting conference center. In this way, the virtual conference center by interfacing with multiple conference centers can provide the users with accounts on different conference centers with the appearance that their accounts are all on the same conference center.

In one embodiment, the virtual conference center provides a user store that maps users to their assigned conference center. For example, if the virtual conference center architecture includes four conference centers, then user A might be assigned to conference center 1, and user B might be assigned to conference center 3. The user store would contain an entry that maps user A to conference center 1 and user B to conference center 3. Each user can be considered to have an account on the virtual conference center and on their assigned conference center—although the user need only be aware of the virtual conference center account. The virtual conference center includes an add user component that allows an administrator of the virtual conference center to create a virtual conference center account and a conference center account for each user. The administrator may provide the user identifier and password to the add user component. The add user component assigns one of the conference centers to the user. For example, the add user component may select the conference center with the most capacity to assign to the user. The add user component then directs the selected conference center to create an account for the user. When the account is created, the add user component then updates the user store to map the user identifier to the assigned conference center. Each user who has an account on a conference center accesses their assigned conference center via the virtual conference center. The virtual conference center also has a login component that allows users with accounts on the conference centers to log in to their assigned conference centers. For example, each user may be provided with the URL of a login web page of the virtual conference center. The login web page may request the user to provide their identifier and password. Upon receiving the identifier and password, the login component uses the mapping to identify the conference center assigned to that user identifier. The login component then requests the assigned conference center to verify that the user account exists and verify the password. If the password is verified, then the virtual conference center directs the user's computer to automatically log the user in to the assigned conference center. When the automatic login is complete, the user is presented with a web page of their assigned conference center and can interact with the conference center services in a conventional manner. In this way, all users access their accounts through a single virtual conference center regardless of the conference center on which their accounts have been created. Moreover, an administrator need not worry about the conference center to which a user is assigned as the virtual conference center performs the assignment automatically.

In one embodiment, the virtual conference center allows users to join conferences hosted by the conference centers through the virtual conference center. The virtual conference center includes a join conference component that receives requests from users to join a conference, identifies the conference center that is hosting the conference, and directs the user's computer to automatically join the conference. The join conference component provides a web page through which a user can identify the conference that user wants to join, their conference name, and the conference password. The join conference component then identifies the conference center that is hosting the conference. For example, the virtual conference center may maintain a mapping of conferences to hosting conference centers. Alternatively, the identification of the hosting conference center may be encoded into the conference identifier. For example, the first four characters of the conference identifier may encode the hosting conference center. After identifying the hosting conference center, the join conference component requests the hosting conference center to verify that the user is authorized to join the conference. If the user is authorized, the join conference component directs the user's computer to automatically join the conference at the hosting conference center. The hosting conference center then provides the user interface of the conference directly to the user's computer. When a conference is scheduled, a participant may receive an invitation via an electronic mail message that contains a link to the conference on the hosting conference center. If the participant selects the link to join the conference, the link will access the join conference web page of the hosting conference center directly and not via the virtual conference center.

In one embodiment, the virtual conference center allows a virtual conference center administrator to synchronize the virtual conference center accounts with the conference center accounts. The virtual conference center accounts and the conference center accounts may become unsynchronized because an administrator adds or deletes user accounts using the administrative services of the conference centers directly, rather than by using the administrative services of the virtual conference center. In such a case, there may be a virtual conference center account with no corresponding conference center account or a conference center account with no corresponding virtual conference center account. The virtual conference center includes a synchronization component that identifies the accounts of the conference centers. The synchronization component then adds a virtual conference center account for each conference center account with no corresponding virtual conference center account. Similarly, the synchronization component removes virtual conference center accounts when there is no corresponding conference center account. In this way, the virtual conference center and the conference center can keep their accounts synchronized.

In one embodiment, the virtual conference center provides a technical support service that facilitates problem solving across multiple conference centers. The virtual conference center provides a technical support component through which an administrator can access technical support services of a conference center assigned to a user having problems. When a user experiences problems, the user may report the problem to an administrator. The administrator can log in using a web page of the virtual conference center. To log in, the administrator provides the user's identifier and an administrator password. The technical support component identifies the conference center assigned to the user, verifies that the account of the user is still active, verifies that the administrator password is valid, and directs the administrator's computer to automatically log the administrator in to the assigned conference center.

In one embodiment, the virtual conference center verifies a user's access to a conference center before directing the user's computer to access the conference center. For example, the login component checks that the user's account exists and verifies the user's password with the assigned conference center. If the account does not exist or the password is not verified, then the virtual conference center provides an error web page to the user. Thus, the virtual conference center handles access errors to minimize the chances that an automatic login or join will fail resulting in an access state that is difficult for the user to decipher.

FIG. 1 is a block diagram illustrating the architecture of a virtual conference center in one embodiment. The virtual conference center 100 is connected to conference centers 104 and the virtual conference center database 103. The virtual conference center users may access the virtual conference center via a portal 102. The portal may be a web server hosted by the enterprise that is using the virtual conference center. The portal may provide a web page through which a user can access the virtual conference center. The web page may be within the domain of the enterprise and include links to the virtual conference center, which may be within a different domain. The virtual conference center database (i.e., user store) includes a mapping of user identifiers to assigned conference centers and may include user passwords. In some embodiments, the user database may include a mapping of the scheduled conferences to hosting conference centers. The provisioning application 101 executes on a computer system of the enterprise. The provisioning application interfaces with the virtual conference center so that administrators can add and remove users, synchronize accounts, and perform other administrative functions.

Figure 2:
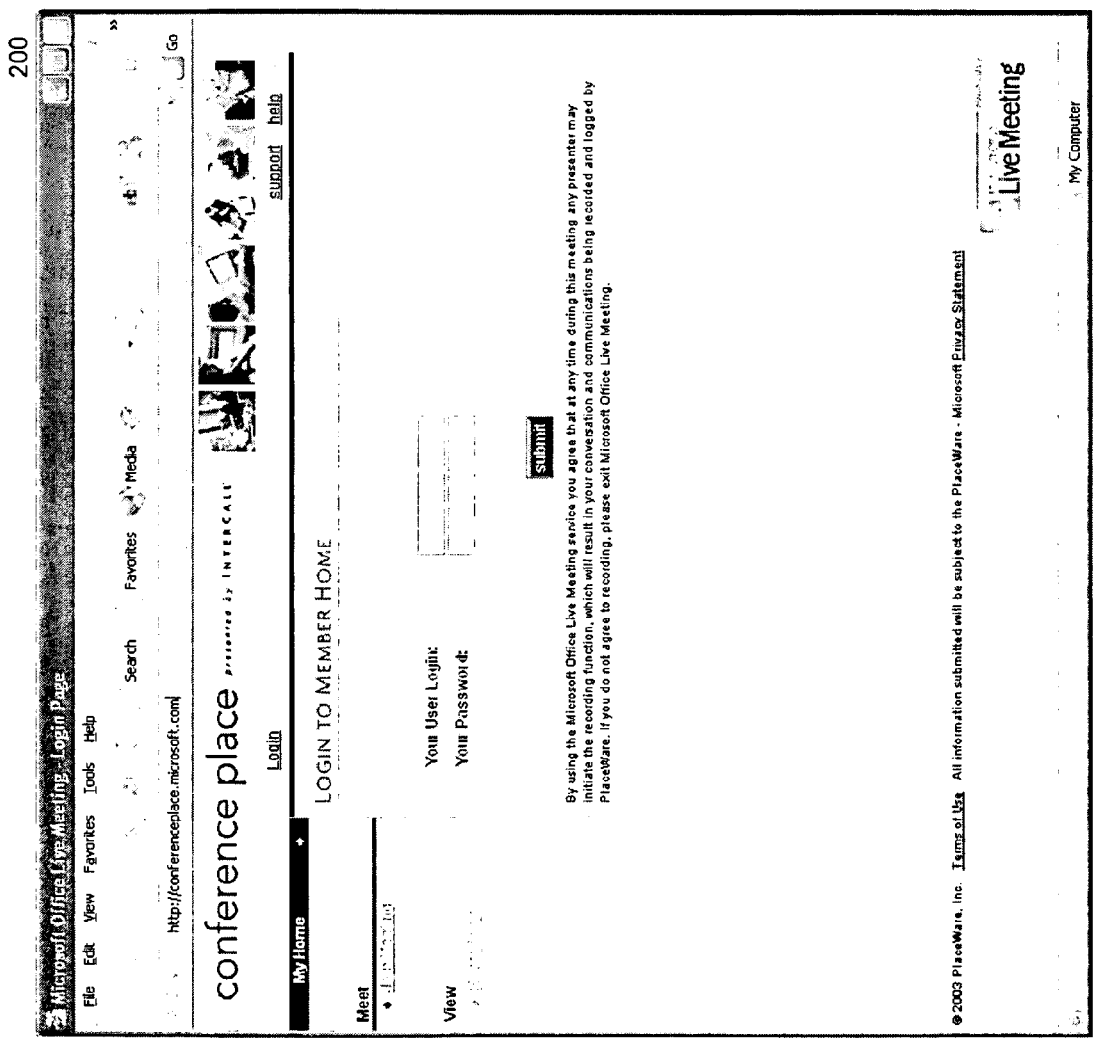
FIG. 2 is a display page that illustrates the logging in of a user to the virtual conference center system in one embodiment.

FIG. 2 is a display page that illustrates the logging in of a user to the virtual conference center system in one embodiment. The display page 200 may be served to the user in response to the user selecting a link on a web page provided by the portal. To log in to the virtual conference center, the user enters their user identifier and password and selects the submit button. The user may also select the "Join Meeting" link to join a conference or the "Recordings" link to view recorded conferences. When the user selects the submit button, the virtual conference center identifies the conference center to which the user has been assigned, verifies that the user can log in to that conference center, and directs the user's computer to automatically log in to the assigned conference center.

Figure 3:
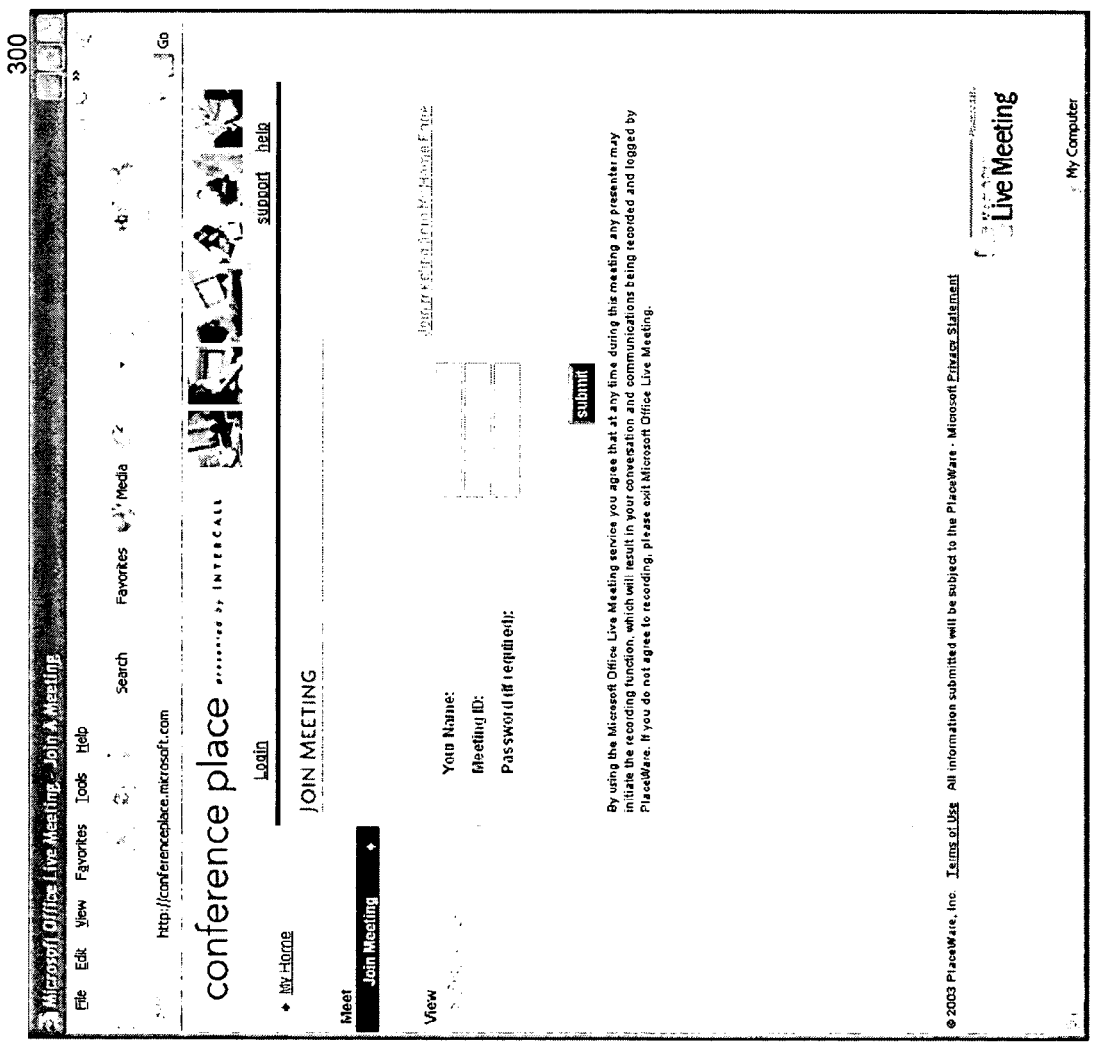
FIG. 3 is a display page that illustrates the joining of a conference by a user of the virtual conference center system in one embodiment.

FIG. 3 is a display page that illustrates the joining of a conference by a user of the virtual conference center system in one embodiment. The display page 300 allows a user to input their name, identifier of the conference, and a password if required by the conference. The user selects the submit button to join the conference. Upon receiving the request to join the conference, the virtual conference center system identifies the conference center that is hosting the conference, verifies whether the password for the conference is correct, and then directs the user's computer system to automatically join the conference directly with the hosting conference center.

Figure 4:
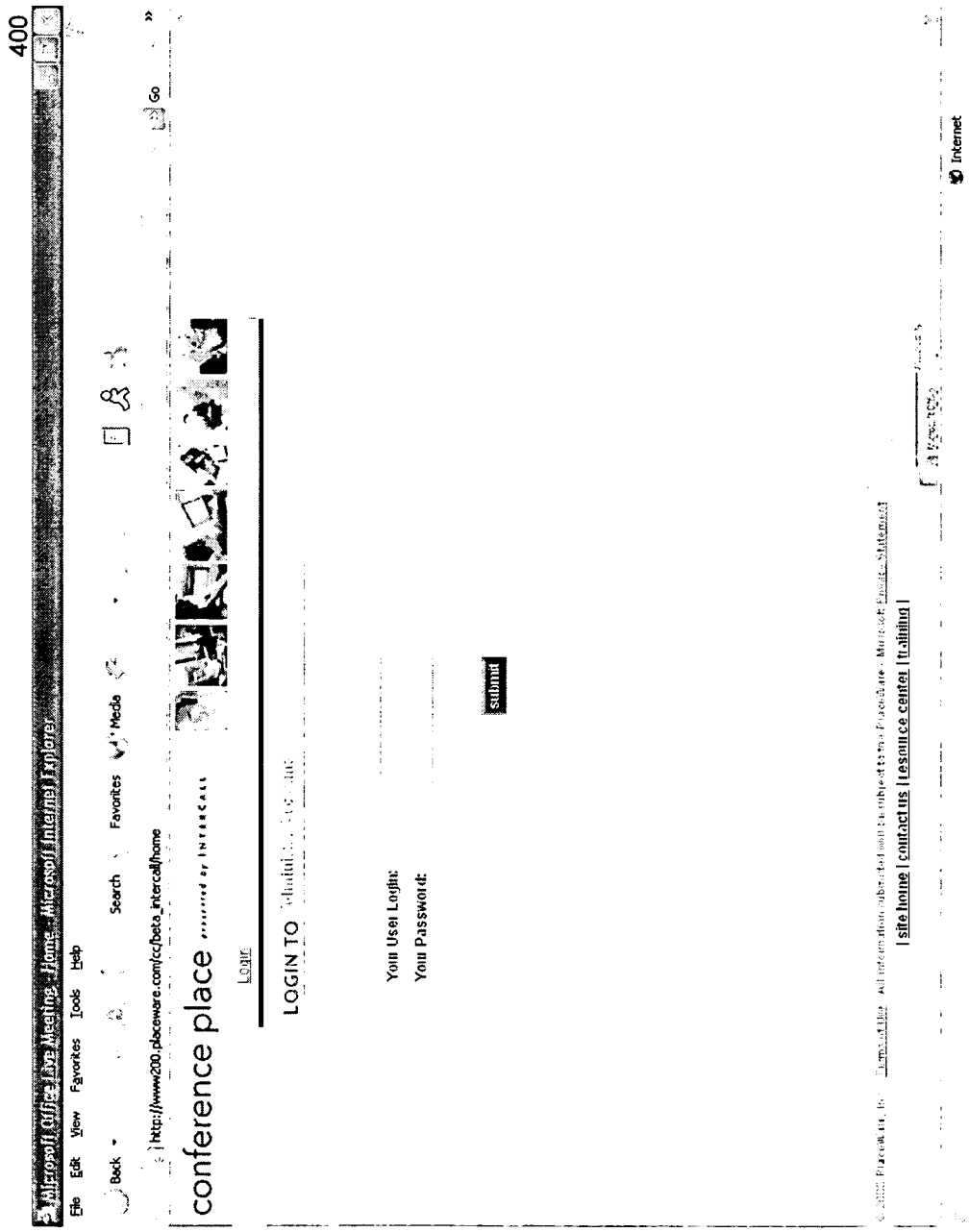
FIG. 4 is a display page that illustrates the logging in to an administrative account of the virtual conference center system in one embodiment.

FIG. 4 is a display page that illustrates the logging in to an administrative account of the virtual conference center system in one embodiment. The display page 400 allows a user to enter their user identifier (as an administrator) and password. The user then selects the submit button. Upon receiving the request to log in, the virtual conference center system ensures that the user has administrative rights to the virtual conference center and, if so, presents an administrative web page to the user. The administrative web page allows the user to select various administrative options, such as creating and removing a virtual conference center account, changing the assignment between user and conference center, and so on.

Figure 5:
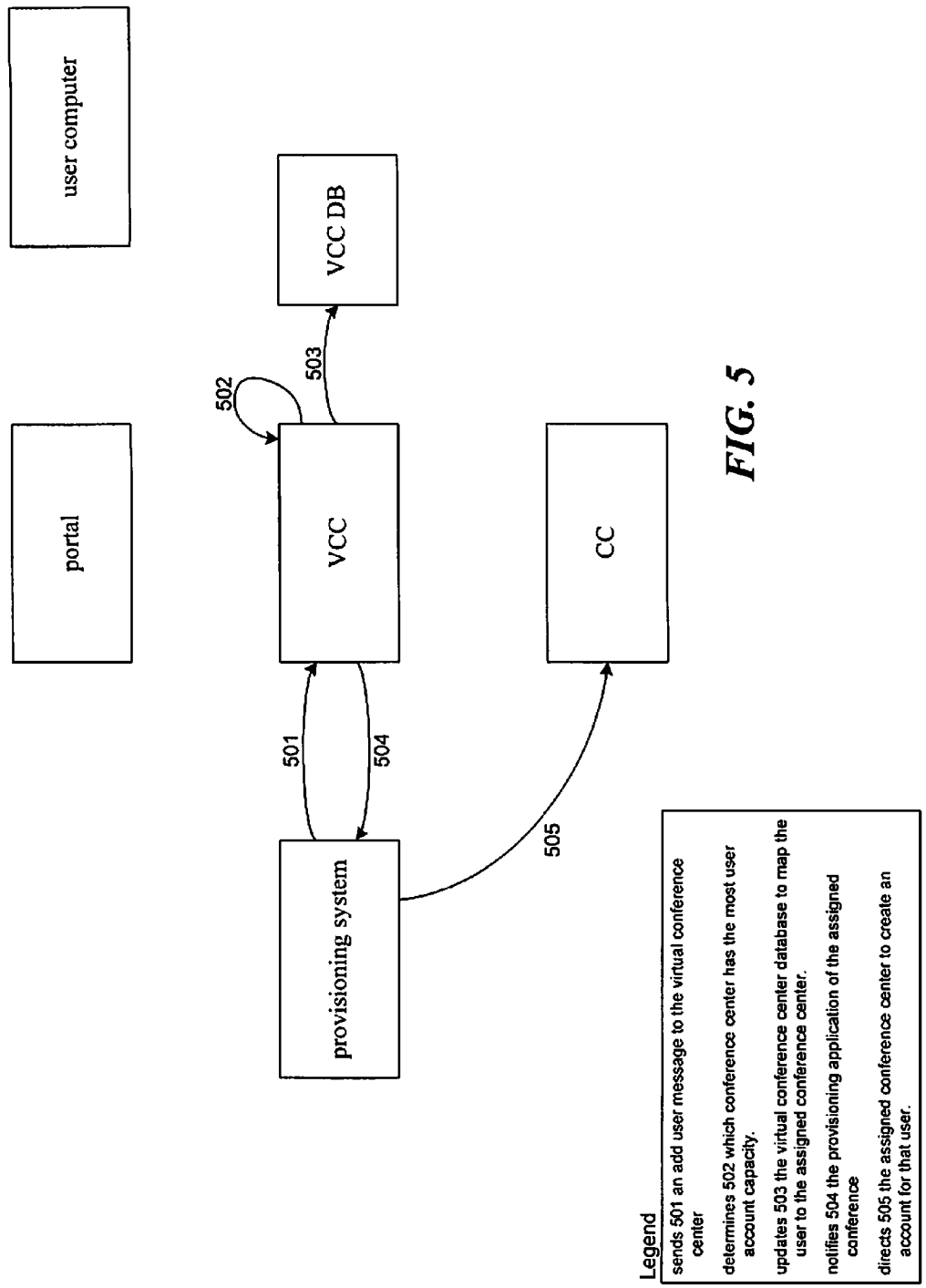
FIG. 5 is a data flow diagram that illustrates the flow of data when a new virtual conference center account is created in one embodiment.

FIG. 5 is a data flow diagram that illustrates the flow of data when a new virtual conference center account is created in one embodiment. The provisioning application initiates the creating of a new account by sending 501 an add user message to the virtual conference center. Upon receiving the message, the virtual conference center determines 502 which conference center has the most user account capacity. In one embodiment, the virtual conference center selects the conference center that has the largest percentage of its capacity available. For example, if one conference center can support 50,000 accounts and currently has 20,000 accounts, then it is at 40% capacity and has an available capacity of 30,000. If another conference center can support 25,000 accounts and currently has 8,000 accounts, then it is at 32% capacity and has an available capacity of 17,000. In such a case, the virtual conference center will select to assign the account to the conference center that is at 32% capacity, even though the conference center that has the 40% capacity has an available capacity that is larger. One skilled in the art would appreciate that many different load-balancing techniques may be used to assign users to conference centers. For example, the assignment may factor in the usage patterns of the users assigned to a conference center. The virtual conference center then updates 503 the virtual conference center database to map the user to the assigned conference center. The virtual conference center then notifies 504 the provisioning application of the assigned conference. The provisioning application then directs 505 the assigned conference center to create an account for that user. Thus, the virtual conference center and the conference center will have synchronized accounts for the user.

Figure 6:
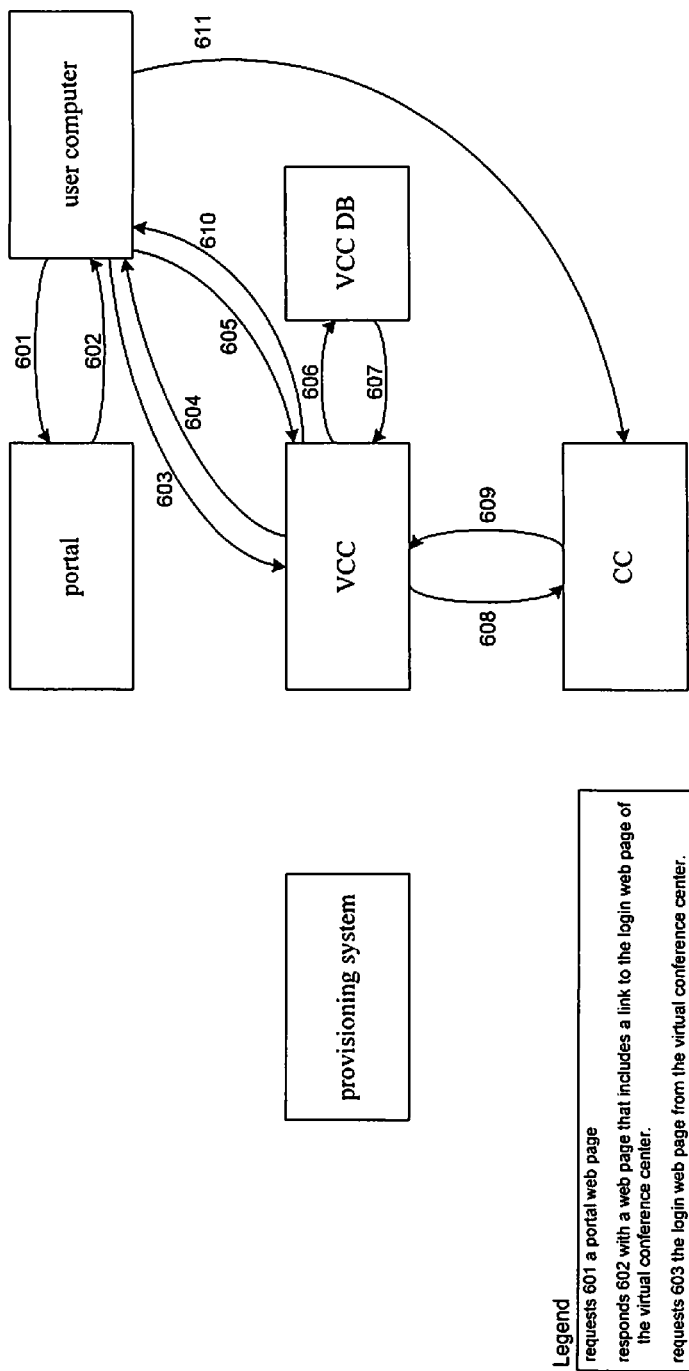
FIG. 6 is a data flow diagram that illustrates the flow of data when a user logs in to the virtual conference center in one embodiment.

FIG. 6 is a data flow diagram that illustrates the flow of data when a user logs in to the virtual conference center in one embodiment. The user's computer requests 601 a portal web page, and the portal server responds 602 with a web page that includes a link to the login web page of the virtual conference center. When the user selects the link, the user's computer requests 603 the login web page from the virtual conference center. The virtual conference center responds 604 with the login web page. When the user enters their user identifier and password and selects the submit button, the user's computer requests 605 the login by sending the user identifier and password. When the virtual conference center receives the request, it requests 606 the database to identify 607 the conference center assigned to the user. The virtual conference center requests 608 the assigned conference center to verify that the user has a valid account. The assigned conference center responds 609 with the verification. The virtual conference center then sends 610 to the user's computer a script that when executed by the user's computer will log the user in to the assigned conference center. The user's computer then requests 611 to log the user in to the assigned conference center.

Figure 7:
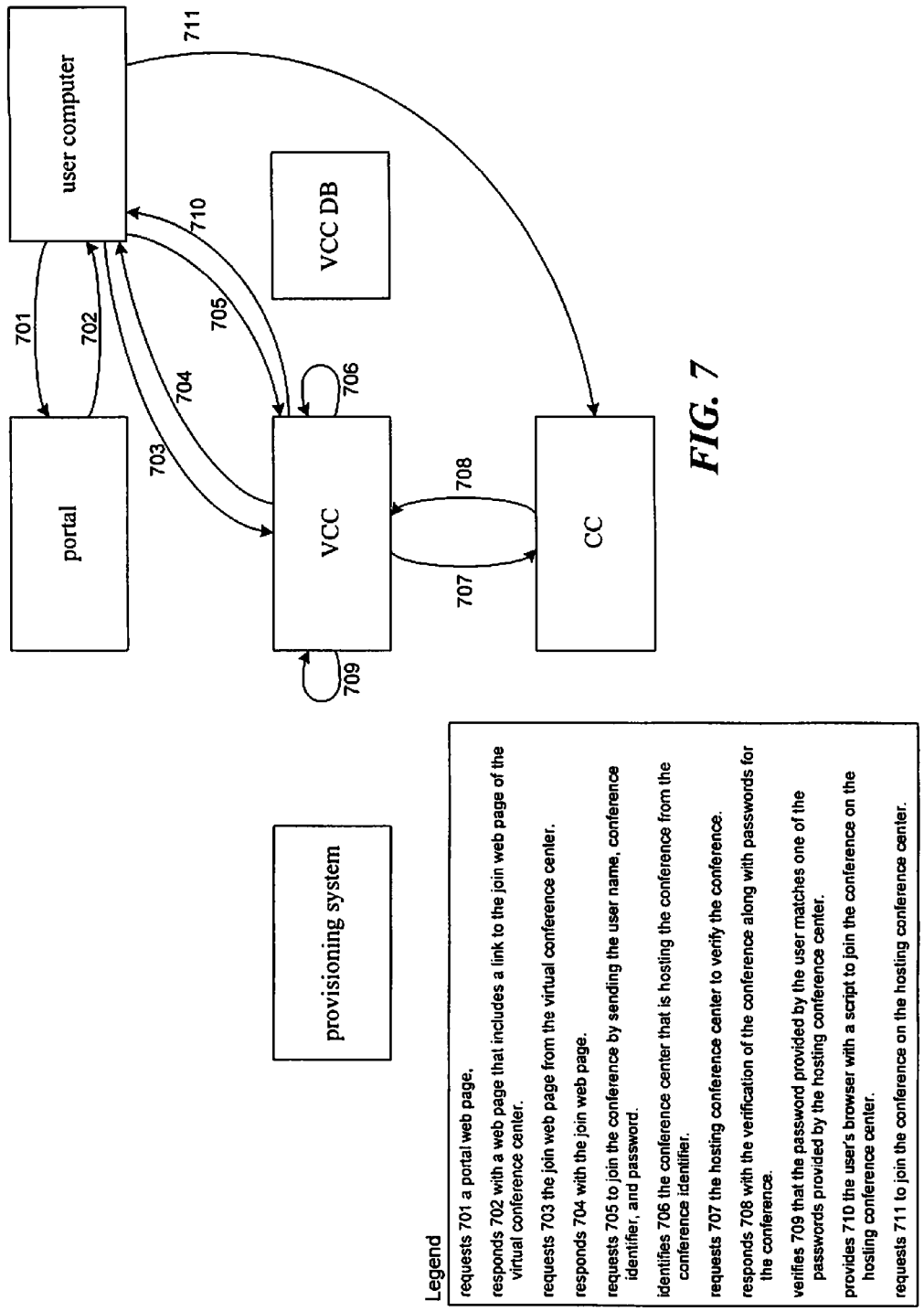
FIG. 7 is a data flow diagram that illustrates the flow of data when a user joins a conference via the virtual conference center in one embodiment.

FIG. 7 is a data flow diagram that illustrates the flow of data when a user joins a conference via the virtual conference center in one embodiment. The user's computer requests 701 a portal web page, and the portal server responds 702 with a web page that includes a link to the join web page of the virtual conference center. When the user selects the link, the user's computer requests 703 the join web page from the virtual conference center. The virtual conference center responds 704 with the join web page. When the user enters their user name, conference identifier, and password and selects the submit button, the user's computer requests 705 to join the conference by sending the user name, conference identifier, and password. The virtual conference center then identifies 706 the conference center that is hosting the conference from the conference identifier. The virtual conference center then requests 707 the hosting conference center to verify the conference. The hosting conference center responds 708 with the verification of the conference along with passwords for the conference. The virtual conference center then verifies 709 that the password provided by the user matches one of the passwords provided by the hosting conference center. The virtual conference center then provides 710 the user's browser with a script to join the conference on the hosting conference center. The user's computer then requests 711 to join the conference on the hosting conference center.

FIG. 8 is a data flow diagram that illustrates the flow of data when a user accesses the technical support service of the virtual conference center in one embodiment. The user's computer requests 801 a technical support web page from the virtual conference center, and the virtual conference center responds 802 with the web page. The user enters the user identifier of the user having the technical difficulties and their administrative password via the web page. The user's computer then requests 803 to log in the user as an administrator sending the user identifier and administrator password to the virtual conference center. The virtual conference center requests 804 the database to identify the conference center assigned to the user identifier. The database responds 805 with the assigned conference center. The virtual conference center then verifies 806 the administrative password. The virtual conference center then sends 807 to the user's browser a script to log in the user as an administrator on the assigned conference center. The user's computer then requests 808 to log the user in to the assigned conference center as an administrator.

Figure 9:
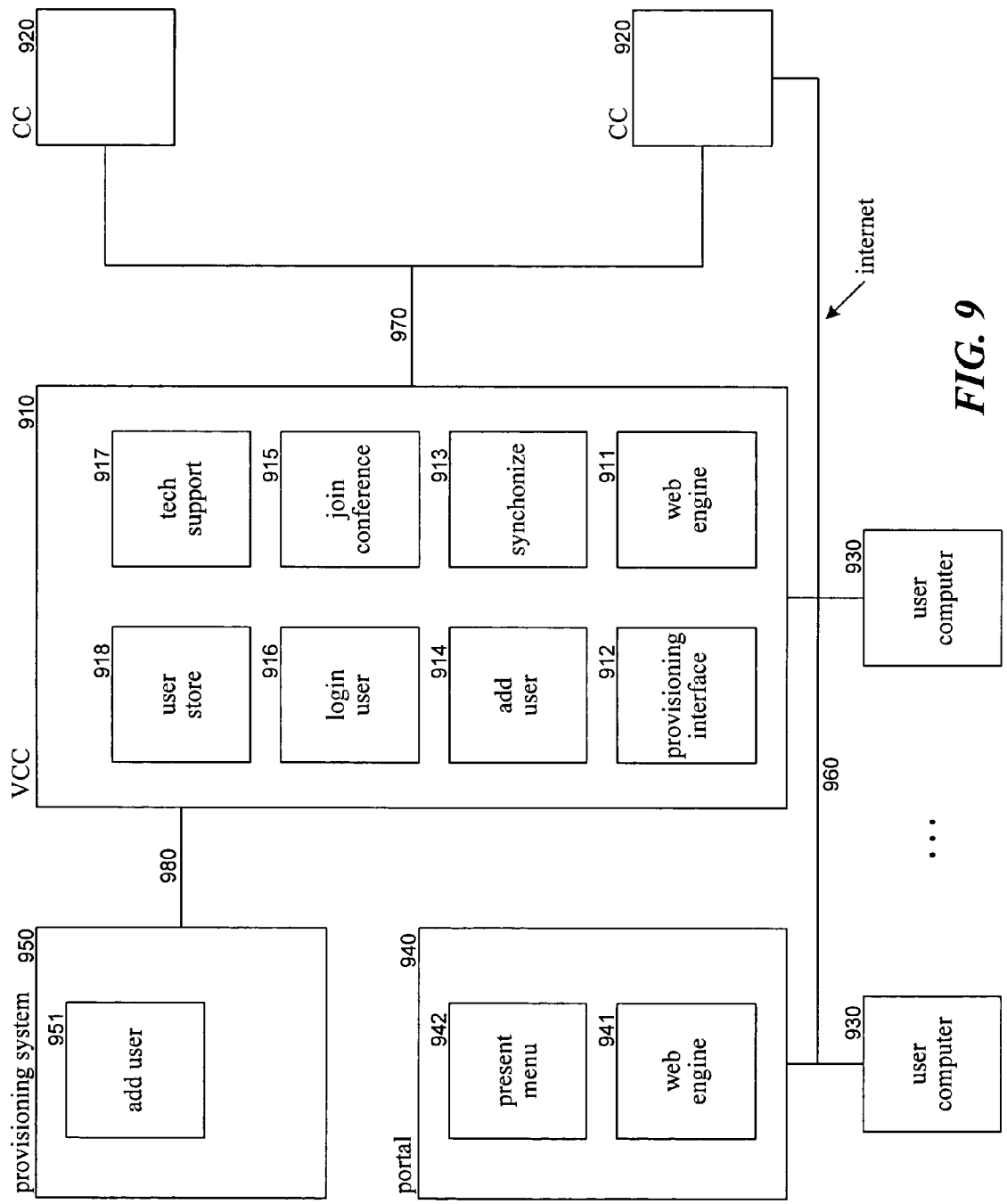
FIG. 9 is a block diagram illustrating components of the virtual conference center in one embodiment.

FIG. 9 is a block diagram illustrating components of the virtual conference center in one embodiment. The virtual conference center 910 is connected to the user computers 930 via a communications link 960. The virtual conference center is also connected to the conference centers 920 via a communications link 970 and acts as a front end to the conference centers. The virtual conference center is also connected to the provisioning system 950 via a communications link 980. The portal 940 is connected to the user computers 930 via the communications link 960. The communications links 960, 970, and 980 may be the same communications link or different communications links. For example, communications link 960 may be the Internet and communications links 970 and 980 may be a local area network. The virtual conference center includes a web engine 911, a provisioning interface 912, a synchronize component 913, an add user component 914, a join conference component 915, a login user component 916, a technical support component 917, and a user store 918. The web engine receives web page requests from user computers, interacts with the components of the virtual conference center to generate the requested web page, and then provides the requested web page to the user computer. The provisioning interface receives a request from the provisioning system to maintain the accounts. The synchronize component synchronizes user accounts of the virtual conference center with user accounts of the conference centers. The add user component is invoked by the provisioning interface to add users to the user store. The login user component controls the logging in of a user to the virtual conference center and directs the user's computer to log the user in to their assigned conference center. The join conference component receives a request to join a conference, identifies the hosting conference center, and directs the user's computer system to join the conference. The technical support component receives a request from technical support personnel to log in to the virtual conference center for solving a problem for a certain user, identifies the conference center assigned to that user, and directs the user's computer to log in to the assigned conference center as an administrator. The portal includes a web page engine 941 and a presentation menu component 942. The web engine provides a web page to the user computer with links to the login and join conference web pages of the virtual conference center. When a user selects a link, the user's computer retrieves the corresponding web page from the virtual conference center. The provisioning system includes an add user component 951 that is provided with a user identifier and password and requests the virtual conference center to create both a virtual conference center account and a conference center account for that user.

The computing device on which the virtual conference system, the conference centers, the portal, the provisioning system, and the user computers are implemented may include a central processing unit, memory, input devices (e.g., keyboard and pointing devices), output devices (e.g., display devices), and storage devices (e.g., disk drives). The memory and storage devices are computer-readable media that may contain instructions that implement the systems. In addition, the data structures, display pages (e.g., web pages), and message structures may be stored or transmitted via a data transmission medium, such as a signal on a communications link. Various communications links may be used, such as the Internet, a local area network, a wide area network, a point-to-point dial-up connection, a cell phone network, and so on.

The virtual conference center architecture may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 10:
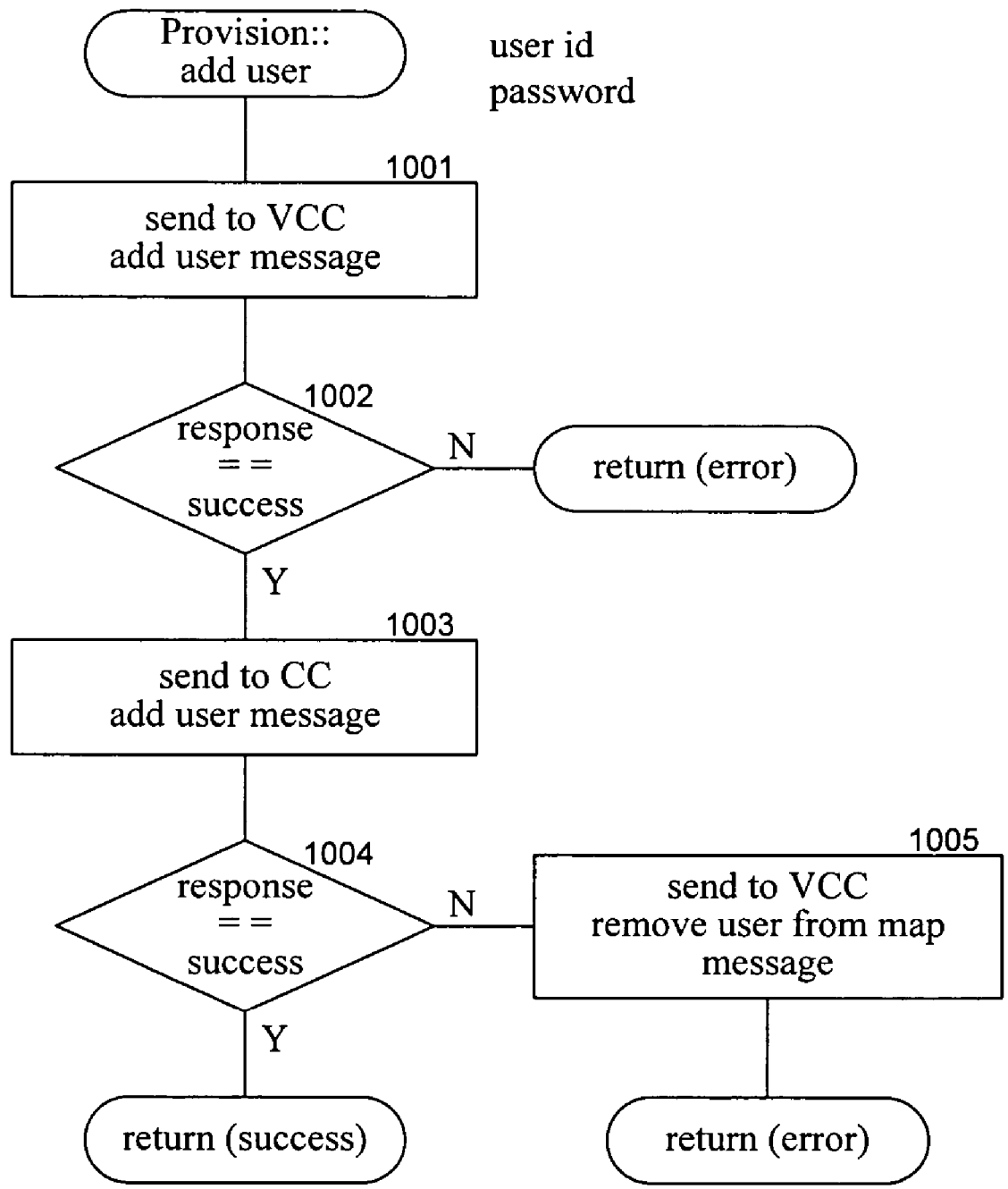
FIG. 10 is a flow diagram that illustrates the processing of the add user component of the provisioning system in one embodiment.

FIG. 10 is a flow diagram that illustrates the processing of the add user component of the provisioning system in one embodiment. The add user component is passed a user identifier and password for the user to be added to the virtual conference center. In block 1001, the component sends an add user message to the virtual conference center. The message includes the user identifier and the password. In decision block 1002, if the response received from the virtual conference center indicates that the user was successfully added, then the component continues at block 1003, else the component returns an error. The response from the virtual conference center also includes an indication of the conference center assigned to the user. In block 1003, the component sends an add user message to the assigned conference center. In decision block 1004, if the assigned conference center indicates that the user was successfully assigned, then the component returns an indication of success, else the component continues at block 1005. In block 1005, the component sends a remove user message to the virtual conference center to remove the user since the user's account was not successfully created on the assigned conference center. The component then returns an error indication.

Figure 11:
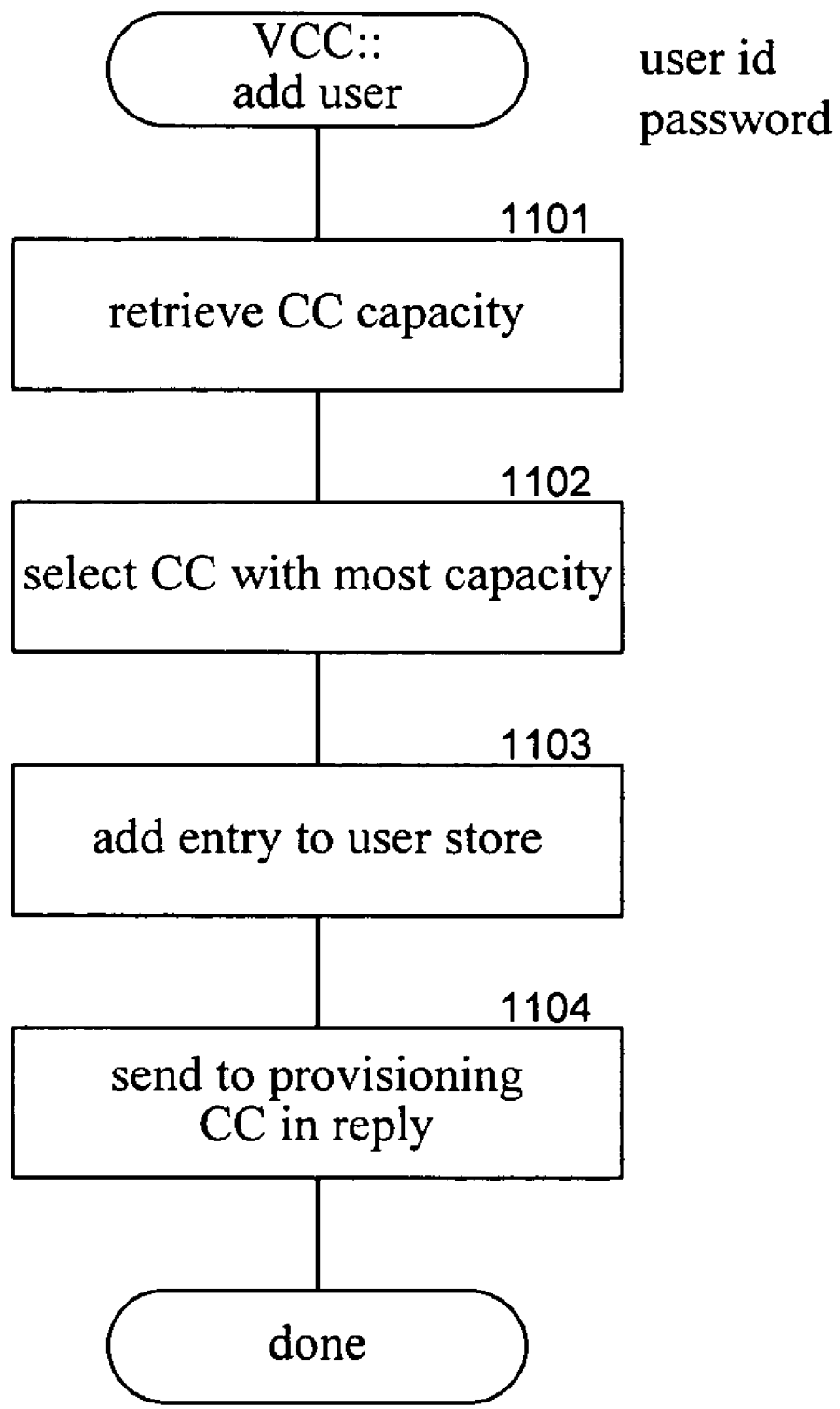
FIG. 11 is a flow diagram that illustrates the processing of the add user component of the virtual conference center in one embodiment.

FIG. 11 is a flow diagram that illustrates the processing of the add user component of the virtual conference center in one embodiment. The add user component is provided with a user identifier and password of the user to add to the virtual conference center. In block 1101, the component retrieves the capacities of the conference centers by, for example, sending a message to the conference centers. Alternatively, the virtual conference center may periodically request the capacities from the conference centers and store the capacities in its database. In block 1102, the component selects a conference center with the most capacity to assign to the user. In block 1103, the component adds an entry to the user store that indicates the user is assigned to the conference center. In block 1104, the component sends an indication of the assigned conference message in a reply to the provisioning system. The component then completes.

Figure 12:
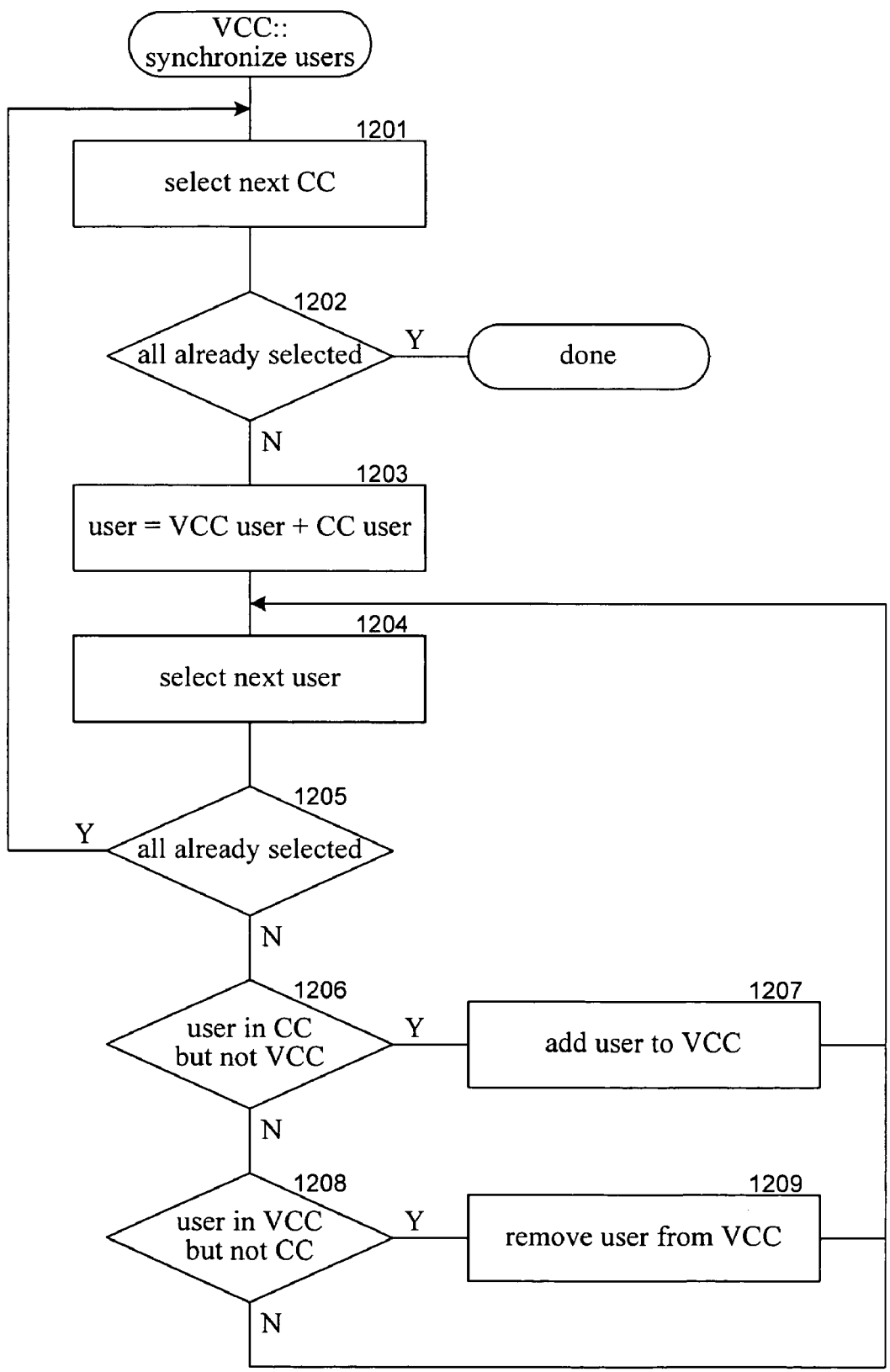
FIG. 12 is a flow diagram that illustrates the processing of the synchronize component of the virtual conference center system in one embodiment.

FIG. 12 is a flow diagram that illustrates the processing of the synchronize component of the virtual conference center system in one embodiment. In block 1201, the component selects the next conference center. In decision block 1202, if all the conference centers have already been selected, then the component completes, else the component continues at block 1203. In block 1203, the component retrieves an indication of the users of the virtual conference center and the selected conference center. In blocks 1204-1209, the component loops synchronizing the virtual conference center accounts with the accounts of the selected conference center. In block 1204, the component selects the next user. In decision block 1205, if all the users have already been selected for the selected conference center, then the component loops to block 1201 to select the next conference center, else the component continues at block 1206. In decision block 1206, if the user has an account on the selected conference center but not on the virtual conference center, then the component continues at block 1207, else the component continues at block 1208. In block 1207, the component adds the user to the virtual conference center and assigns the user to the selected conference center and then loops to block 1204 to select the next user. In decision block 1208, if the user has an account on the virtual conference center but not on the selected conference center, then the component continues at block 1209. In block 1209, the component removes the account of the selected user from the virtual conference center. The component then loops to block 1204 to select the next user.

Figure 13:
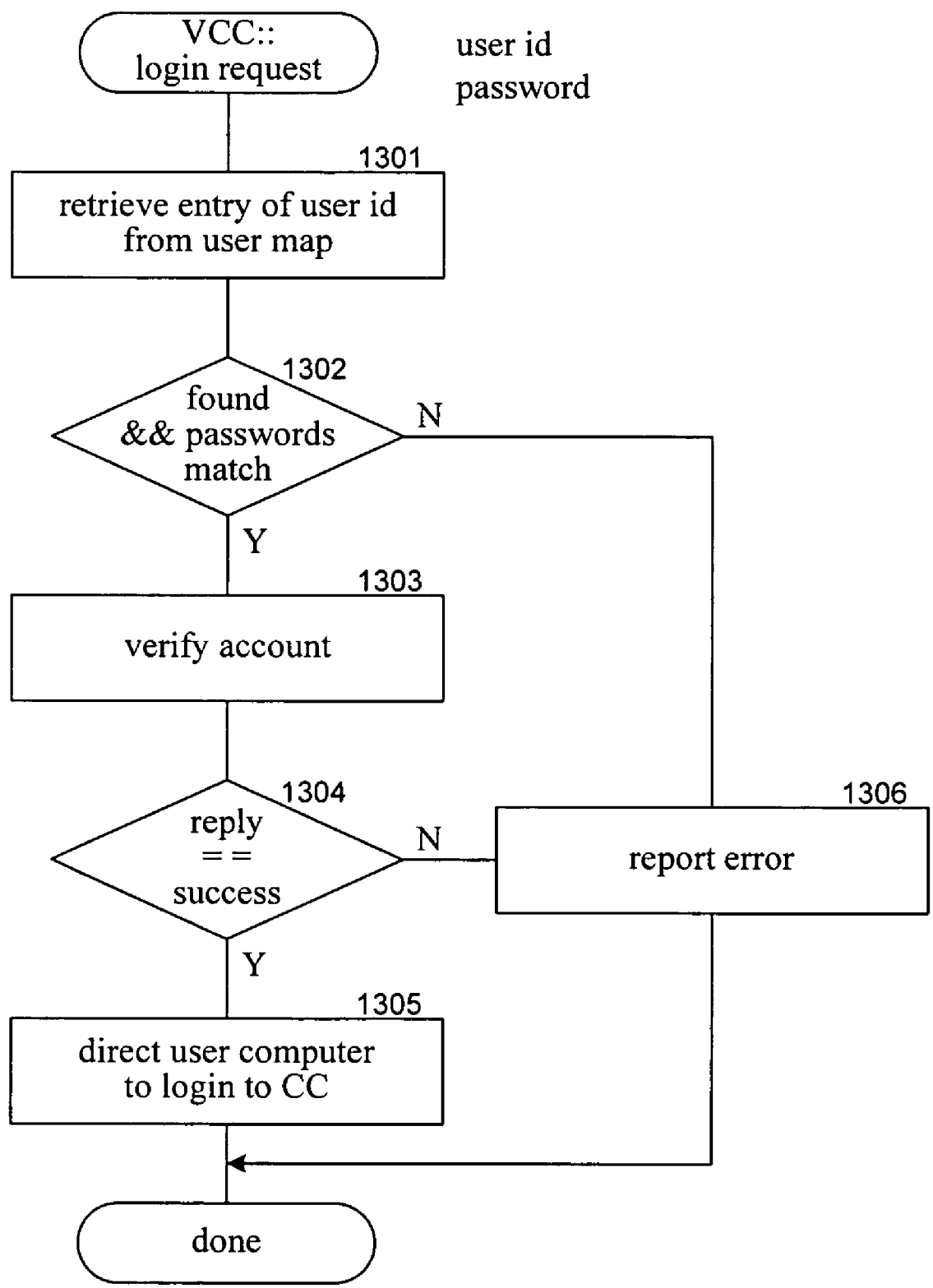
FIG. 13 is a flow diagram that illustrates the processing of the login component of the virtual conference center in one embodiment.

FIG. 13 is a flow diagram that illustrates the processing of the login component of the virtual conference center in one embodiment. The component is passed a user identifier and password of a user attempting to log in to the virtual conference center. In block 1301, the component retrieves the entry for the user identifier from the user store. In decision block 1302, if the entry for the user identifier was found and the passwords match, then the component continues at block 1303, else the component continues at block 1306 to report an error and then completes. In block 1303, the component requests the assigned conference center as indicated by the retrieved entry to verify that the user has an account with the conference center. In decision block 1304, if the reply indicates that the user has an account, then the component continues at block 1305, else the component reports an error in block 1306 and then completes. In block 1305, the component directs the user computer to log in to the assigned conference center using the passed user identifier and password.

Figure 14:
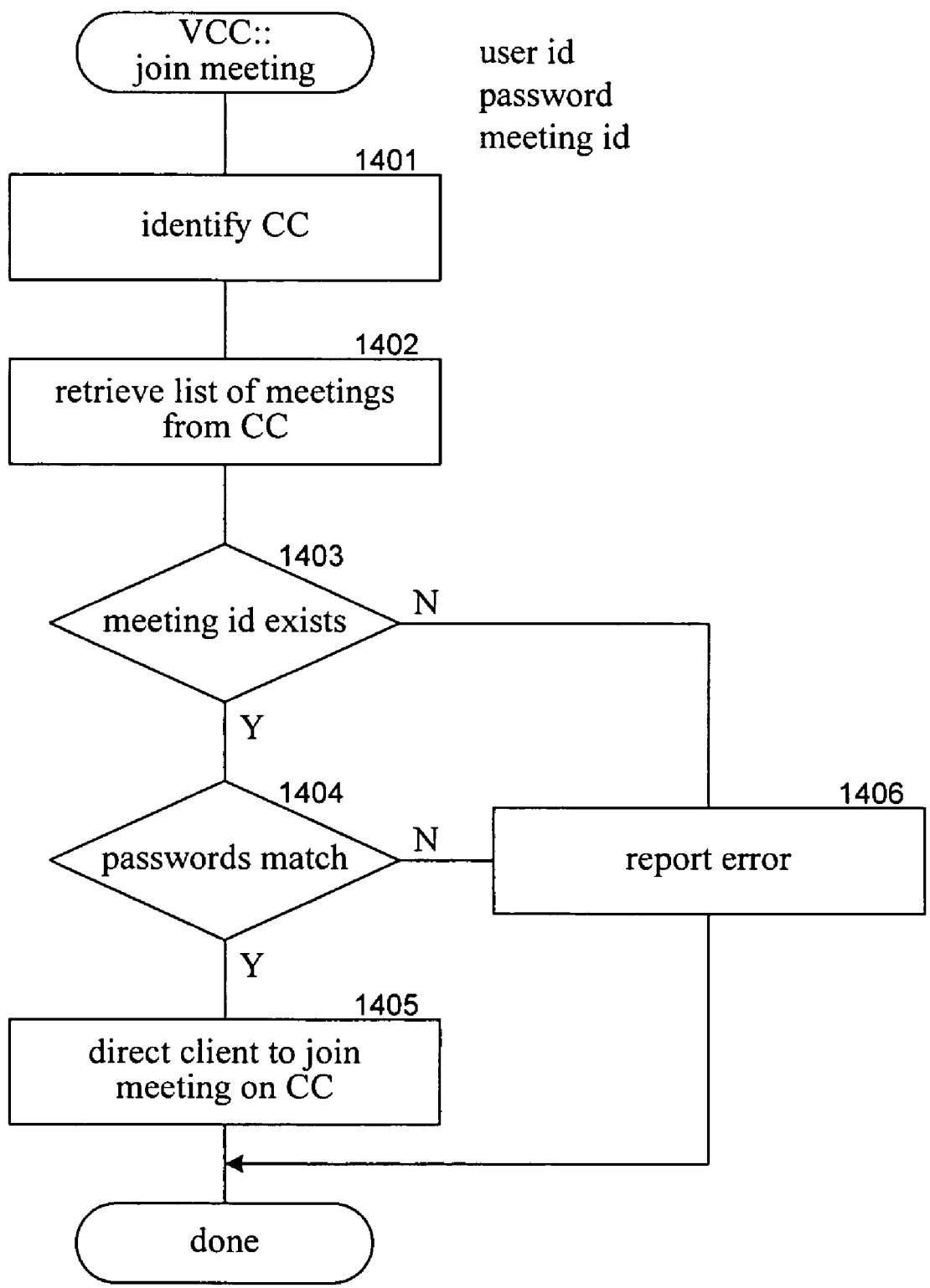
FIG. 14 is a flow diagram that illustrates the processing of the join conference component of the virtual conference center in one embodiment.

FIG. 14 is a flow diagram that illustrates the processing of the join conference component of the virtual conference center in one embodiment. The component is passed a user name, conference identifier, and optionally a conference password. In block 1401, the component identifies the conference center that is hosting the conference. In block 1402, the component verifies the identified conference with the hosting conference center and receives the conference password in response. In decision block 1403, if the hosting conference center verifies the conference, then the component continues at block 1404, else the component reports an error in block 1406 and then completes. In decision block 1404, if the passed password matches a password returned from the hosting conference center, then the component continues at block 1405, else the component reports an error in block 1406 and completes. In block 1405, the component directs the user computer to join the conference on the hosting conference center and then completes.

Figure 15:
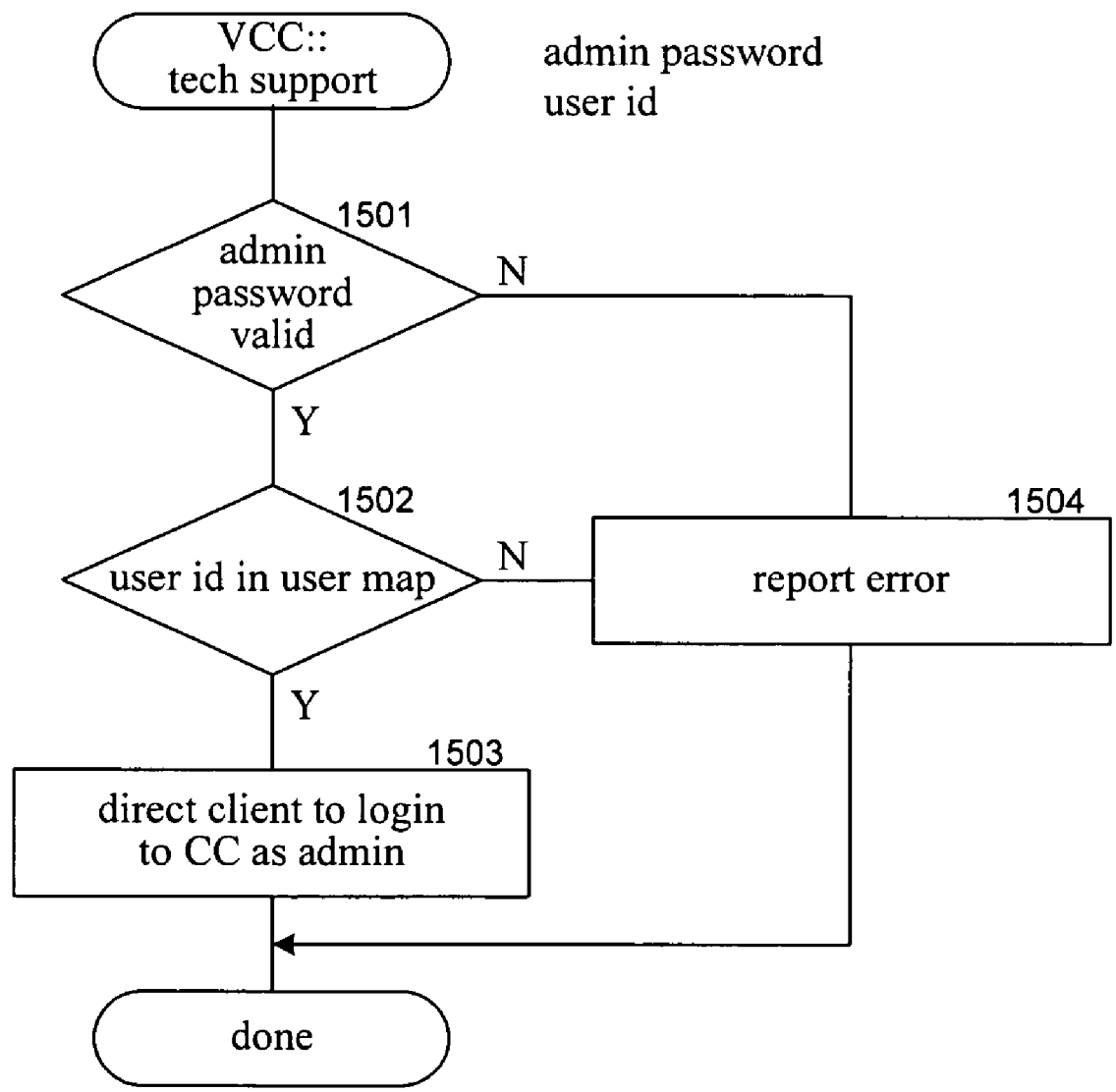
FIG. 15 is a flow diagram that illustrates the processing of the technical support component of the virtual conference center in one embodiment.

FIG. 15 is a flow diagram that illustrates the processing of the technical support component of the virtual conference center in one embodiment. The component is passed an administrator's password and the identifier of a user who is experiencing difficulties. In decision block 1501, if the administrator password is valid, then the component continues at block 1502, else the component reports an error in block 1504 and completes. In decision block 1502, if the user identifier corresponds to a virtual conference center user, then the component continues at block 1503, else the component reports an error in block 1504 and then completes. In block 1503, the component directs the user's computer to log in to the conference center assigned to the user as an administrator. The component then completes.

From the foregoing, it will be appreciated that specific embodiments of the virtual conference center have been described herein for purposes of illustration, but that various modifications may be made without deviating from the spirit and scope of the invention. One skilled in the art will appreciate that the conference centers may have a configuration flag indicating whether it is part of a virtual conference center. When part of a virtual conference center, a conference center may generate conference identifiers so that the virtual conference center can identify the conference center hosting the conference from the conference identifier. One skilled in the art will also appreciate that certain functions between users of the same conference center may not be available between all users of a virtual conference center. For example, a conference center may allow a user with an account to define access rights (e.g., access control rights) of other users with an account on the same conference center to the user's resources. The virtual conference center may, however, not be able to provide such access right control between users assigned to different conference centers by the virtual conference center. Accordingly, the invention is not limited except as by the appended claims.

We claim:

1. A computing device that provides a virtual conference center, the virtual conference center providing an interface through which users can access their accounts on multiple conference centers as if their accounts were created on a single conference center, the computing device comprising:
    a processor; and
    one or more storage devices containing
        a user store having entries, each entry identifying a user of the virtual conference center and a conference center on which the user has an account; and
        computer-executable instructions implementing:
            an add user component that receives a user identifier, selects a conference center from a plurality of conference centers, directs an account on the selected conference center to be created for the identified user, and adds an entry to the user store for the identified user indicating the conference center on which the account has been created; and a login component that
receives a request for a user to log in to the virtual conference center, the request including a user identifier and a password;
retrieves from the user store the entry for the user identified by the user identifier;
directs that the user be logged in to the conference center on which the user has an account as indicated by the retrieved entry by sending to the conference center the user identifier and password received in the request; and
receives from the conference center an indication that the password is verified indicating that the user is logged into the conference center;
a synchronization component that identifies the users of the conference centers, and adds an entry to the user store for any identified user that does not already have an entry in the user store and removes entries from the user store when the user of the entry is not an identified user of the conference centers.

2. The computing device of claim 1 including:
a join conference component that receives a request for a user to join a conference, identifies a conference center that is hosting the conference, and directs that the user join the conference at the hosting conference center.

3. The computing device of claim 2 wherein the join conference component provides a display page for the user to provide the identification of the user and the conference.

4. The computing device of claim 3 wherein the join conference component directs the user's computer to send a join conference request to the hosting conference center.

5. The computing device of claim 3 wherein the conference center that is hosting the conference is identified from the identification of the conference.

6. The computing device of claim 5 wherein the identification of the hosting conference center is part of the identification of the conference.

7. The computing device of claim 1 wherein the add user component identifies a conference center based on available capacity of conference centers.

8. A method performed by a computing device for aggregating multiple conference centers, the method comprising:
providing an interface for accessing multiple conference centers; and
providing a virtual conference center that is a front end to the multiple conference centers through which users can be added to the conference centers, log in to the conference centers, and join conferences and the conference centers can be synchronized with the virtual conference center
wherein adding a user to a conference center comprises:
receiving from the user a user identifier that identifies the user;
creating a virtual conference center account for the user;
selecting one of the multiple conference centers to which the user is to be added,
directing an account on the selected conference center to be created for the identified user using the received user identifier and a password; and
adding an entry to a user store for the identified user indicating the selected conference center on which the account for the identified user has been created and indicating the created virtual conference center account;
wherein logging in a user to a conference center comprises:
receiving from the user a request to log in to the virtual conference center, the request including the user identifier and a password; and
in response to receiving the request,
logging the user into the virtual conference center account of the user as indicated by the user store;
retrieving from the user store the entry for the user; and
directing that the user be logged in to the conference center on which the user has an account as indicated by the retrieved entry by sending a login request to the conference center, the login request including the user identifier and the password received from the user in the request to log in to the virtual conference center;
wherein joining of a user to a conference comprises:
receiving from the user a request to join a conference;
identifying a conference center that is hosting the conference; and
directing that the user join the conference at the hosting conference center wherein when the user joins the conference, the user interfaces directly with conference center of the conference; and
wherein synchronizing of the conference centers with the virtual conference center comprises:
identifying users with accounts at the conference centers;
for any identified user that does not already have an entry in the user store, creating a virtual conference center account for the identified user and adding an entry for the identified user to the user store; and
when the user of an entry in the user store is not an identified user with an account at any of the conference centers, removing the virtual conference center account for the user and removing the entry for the user from the user store.

9. The method of claim 8 wherein directing that the user join the conference includes directing a computer of the user to send a join conference request to the hosting conference center.

10. The method of claim 8 wherein the virtual conference center sends to the user a display page for the user to provide their identification, the display page not being received from a conference center.

11. The method of claim 10 wherein the directing that the user be logged in to the conference center includes directing a computer of the user to send a login request to the identified conference center.

12. The method of claim 8 wherein a conference center is identified based on available capacity of conference centers.

13. A computer-readable storage device containing computer-executable instructions for controlling a computing device to perform a method that provides a virtual conference center as a front end to a plurality of existing conference centers so that users log in to accounts of the conference centers and join conferences hosted by the conference centers, the method comprising:
adding a user to a conference center by:
receiving from the user a user identifier that identifies the user, selecting one of the multiple conference centers to which the user is to be added;

directing an account on the selected conference center to be created for the identified user using the received user identifier; and adding an entry to a user store for the identified user indicating the selected conference center on which the account for the identified user has been created;

logging in a user to a conference center by:

receiving from the user a request to log in to the virtual conference center, the request including the user identifier and authentication information; and in response to receiving the request, retrieving from the user store the entry for the user identified by the user identifier; and directing that the user be logged in to the conference center on which the user has an account as indicated by the retrieved entry by sending a login request to the conference center, the login request including the user identifier and the authentication received from the user in the request to log in to the virtual conference center;

joining of a user to a conference by:

receiving from the user a request to join a conference;

identifying a conference center that is hosting the conference; and directing that the user join the conference at the hosting conference center; and synchronizing the data store of the virtual conference center with the conference centers by:

identifying users with accounts at the conference centers;

adding an entry to the user store for any identified user that does not already have an entry in the user store; and removing entries from the user store when the user of the entry is not an identified user with an account at any of the conference centers.

14. The computer-readable storage device of claim 13 wherein the joining of a user to a conference further includes:

providing a web page through which the user can identify the conference that the user wants to join, can identify their conference name, and a conference password; and after receiving the identification of the conference, performing the identifying of the hosting conference center;

after identifying the hosting conference center, requesting the hosting conference center to verify that the user is authorized to join the conference based on their conference name and the conference password; and after verifying that the user is authorized to join the conference, directing the computer of the user to automatically join the conference at the hosting conference center so that the hosting conference center provides a user interface for the conference directly to the computer of the user.

\* \* \* \* \*